United States Patent
Miura et al.

[11] Patent Number: 6,047,461
[45] Date of Patent: Apr. 11, 2000

[54] ROTOR FOR PERMANENT MAGNET EXCITED, HIGH-SPEED ELECTRIC ROTARY MACHINE, MANUFACTURING METHOD OF THE SAME AND ELECTRIC ROTARY MACHINE INCLUDING THE SAME

[75] Inventors: Haruo Miura; Kazuki Takahashi; Hideo Nishida; Naohiko Takahashi; Yasuo Fukushima, all of Ibaraki-ken, Japan

[73] Assignee: Hitachi, Ltd., Tokyo, Japan

[21] Appl. No.: 09/146,349

[22] Filed: Sep. 3, 1998

[30] Foreign Application Priority Data

Sep. 10, 1997 [JP] Japan ................................. 9-245026

[51] Int. Cl.⁷ .......................... H05K 15/02; H02K 21/12
[52] U.S. Cl. .................. 29/598; 29/607; 29/596; 310/156; 310/261; 310/265
[58] Field of Search ................ 29/598, 607, 596; 310/156, 261, 265

[56] References Cited

U.S. PATENT DOCUMENTS

| | | | |
|---|---|---|---|
| 4,617,726 | 10/1986 | Denk | 29/598 |
| 4,625,135 | 11/1986 | Kasabian | 310/156 |
| 4,759,116 | 7/1988 | Jones | 29/598 |
| 4,829,657 | 5/1989 | Wright | 29/598 |
| 4,910,861 | 3/1990 | Dohogue | 29/598 |
| 4,918,802 | 4/1990 | Schaefer | 29/598 |
| 4,930,201 | 6/1990 | Brown | 29/598 |
| 5,144,735 | 9/1992 | Stark | 29/732 |
| 5,485,045 | 1/1996 | Canders et al. | |
| 5,500,994 | 3/1996 | Itaya | 29/598 |
| 5,687,471 | 11/1997 | Noguchi et al. | 29/598 |

FOREIGN PATENT DOCUMENTS 2299217 of 0000 United Kingdom.

OTHER PUBLICATIONS

Japanese Patent Unexamined Publication No. 8–107641.
Japanese Patent Unexamined Publication No. 5–22880.
Japanese Patent Unexamined Publication No. 6–284611.
Japanese Patent Unexamined Publication No. 9–19093.

*Primary Examiner*—Nestor Ramirez
*Assistant Examiner*—Thanh Lam
*Attorney, Agent, or Firm*—Antonelli, Terry, Stout & Kraus, LLP

[57] ABSTRACT

A manufacturing method of a rotor for a permanent magnet-excited, high-speed electric rotary machine according to the present invention comprises, covering an outer circumferential surface of at least one permanent magnet by a fiber-reinforced plastic protection cover with prestress compressing in radial direction; inserting a steel sleeve into the at least one permanent magnet to form a permanent magnet assembly; preparing at least one permanent magnet assembly; inserting a rotor shaft into the steel sleeve while applying hydraulic pressure to an inner circumferential surface of the steel sleeve of the prepared at least one permanent magnet assembly to expand the steel sleeve; and then removing the hydraulic pressure to tight fit the at least one permanent magnet assembly onto the rotor shaft.

21 Claims, 5 Drawing Sheets

ROTOR FOR PERMANENT MAGNET EXCITED, HIGH-SPEED ELECTRIC ROTARY MACHINE, MANUFACTURING METHOD OF THE SAME AND ELECTRIC ROTARY MACHINE INCLUDING THE SAME

BACKGROUND OF THE INVENTION

The present invention relates to a manufacturing method of a rotor for a permanent magnet-excited, high-speed electric rotary machine, particularly to a manufacturing method of a rotor for a large-capacity permanent magnet-excited, high-speed electric rotary machine in which the rotor is rotated at a high speed, for example, not less than thousands of revolutions per minute. The present invention also relates to the rotor and to the electric rotary machine including the rotor.

In general, a rotor for a permanent magnet-excited electric rotary machine includes a rotor shaft, a sleeve and cylindrical permanent magnet assembly which is closely fitted on the rotor shaft, and a protection cover fitted on a cylindrical permanent magnet of the assembly, as disclosed in Japanese Patent Unexamined Publication No. 6-284611. British Patent Application No. GB2299217A and Japanese Patent Unexamined Publication No. 5-22880 each discloses a rotor which includes a plurality of cylindrical permanent magnets and a rotor shaft inserted in the cylindrical permanent magnets. Japanese Patent Unexamined Publication No. 9-19093 discloses a manufacturing method of a protection cover of a fiber-reinforced plastic. Japanese Patent Unexamined Publication No. 8-107641 discloses a protection cover made of a fiber-reinforced plastic. U.S. Pat. No. 5,485,045 discloses a method for attaching a protection cover to a permanent magnet by utilizing a taper form.

In order to rotate a rotor at a high speed, it must be made so that slip is not occurred between the rotor shaft and a permanent magnet assembly by the centrifugal force due to the high-speed rotation. For this purpose, a large interference is needed between the rotor shaft and permanent magnet assembly.

For fitting a permanent magnet on the rotor shaft, the usual shrink fit cannot be applied. This is because the permanent magnet is not largely expanded by being heated because of its small coefficient of thermal expansion, so that the large interference cannot be obtained.

For obtaining an interference between the cylindrical permanent magnet and the rotor shaft, a method is known in which the magnet and a protection cover is fitted on the cooled rotor shaft because the coefficients of thermal expansion of a fiber-reinforced plastic of which the protection cover is made and the magnet material are almost zero. In this method, the interference obtained is determined by the temperature of the rotor shaft. For the most proper method for lowering the temperature of the rotor shaft, there is a method using liquid nitrogen. However, even by this method, the temperature difference obtained is only to the extent of about 170° C. to about 180° C. The higher the rotor speed is, the smaller the diameter of the rotor shaft to be employed is and therefore, an amount of thermal contraction becomes small accordingly. It is therefore difficult to obtain the necessary interference for the high-speed rotor by this method when machining tolerance, working margin and so on are taken into consideration.

Besides, when the cooled rotor shaft comes back gradually to the normal temperature, the rotor shaft enlarges also in an axial direction thereof. However, because the magnet and the protection cover made of the fiber-reinforced plastic hardly enlarge, the protection cover is stretched in the axial direction that the strength thereof is smaller. This may cause that the protection cover is broken. It is thus difficult to apply such a cooling fitting or expansion fitting in assembling the high-speed rotor including the fiber-reinforced plastic (FRP) protection cover.

On the other hand, to increase the capacity of the rotor, a rare-earth sintering magnet having a high flux density must be used for the cylindrical permanent magnet. In such a rare-earth sintered magnet, however, the degree of freedom in shaping is low. In particular, in a cylindrical magnet, it is not possible to enlarge the length of the cylindrical magnet in contrast to an outer diameter thereof. For this reason, in case of large-capacity rotor, a plurality of cylindrical magnets must be juxtaposed on the sleeve in the axial direction. As a result, the total length in the axial direction of the rotor becomes long. Therefore, the stroke for press fitting the rotor shaft into the sleeve becomes long and upon press fitting of the rotor shaft, buckling and/or breakage of the permanent magnets and/or the protection cover occur. Thus, mechanical press fitting cannot be applicable.

SUMMARY OF THE INVENTION

It is an object of the present invention to provide a manufacturing method of a rotor for a permanent magnet-excited, high-speed electric rotary machine, the rotor and the electric rotary machine including the rotor.

A manufacturing method of a rotor for a permanent magnet-excited, high-speed electric rotary machine according to the present invention comprises, covering an outer circumferential surface of at least one permanent magnet by a fiber-reinforced plastic protection cover with prestress compressing in radial direction; inserting a steel sleeve into the at least one permanent magnet to form a permanent magnet assembly; preparing at least one permanent magnet assembly; inserting a rotor shaft into the steel sleeve while applying hydraulic pressure to an inner circumferential surface of the steel sleeve of the prepared at least one permanent magnet assembly to expand the steel sleeve; and then removing the hydraulic pressure to tight fit the at least one permanent magnet assembly onto the rotor shaft.

The method may include a step for cutting away a hydraulic pressure introducing passage of the steel sleeve for applying hydraulic pressure to an inner circumferential surface of the steel sleeve after the step of removing hydraulic pressure.

The method may include a step for disposing end rings on both ends of the at least one permanent magnet upon insertion of the steel sleeve.

The insertion of the rotor shaft is preferably conducted by hydraulic pressure.

In the step of covering the cylindrical permanent magnet with the protection cover of the fiber-reinforced plastic, the cylindrical permanent magnet may be fitted into the protection cover which was made in advance, or a fiber impregnated with a plastic resin is wound onto the cylindrical permanent magnet at a predetermined tension.

A rotor for a permanent magnet-excited, high-speed electric rotary machine according to the present invention comprises at least one permanent magnet assembly and a rotor shaft hydraulically press fitted into the at least one permanent magnet assembly with an interference ratio not less than 0.003. The at least one permanent magnet assembly comprises at least one cylindrical permanent magnet, a steel sleeve which is fitted in the at least one cylindrical permanent magnet and into which the rotor shaft is hydraulically press fitted, and a protection cover made of a fiber-reinforced plastic and covering an outer circumferential surface of the at least one cylindrical permanent magnet with a prestress compressing in radial direction.

The steel sleeve is provided with a passage for introducing hydraulic pressure to an inner circumferential surface thereof.

An leading end of the rotor shaft upon press fitting into the at least one permanent magnet assembly is preferably tapered.

The protection cover may be made in advance and the at least one cylindrical permanent magnet is inserted into the protection cover.

The protection cover may includes fibers wound on the at least one cylindrical permanent magnet with a predetermined tension while being impregnated by plastic resin.

The at least one permanent magnet assembly comprises plural permanent magnet assembly and the plurality of permanent magnet assemblies are juxtaposed on the rotor shaft in an axial direction.

The at least one permanent magnet comprises plural permanent magnets and the plurality of permanent magnets are juxtaposed on the steel sleeve in axial direction.

The rotor further comprises end rings of non-magnetic material fitted on the steel sleeve in such a manner that the end rings urge the at least one permanent magnet from both ends thereof in axial direction.

DESCRIPTION OF THE PREFERRED EMBODIMENTS

Figure 1:
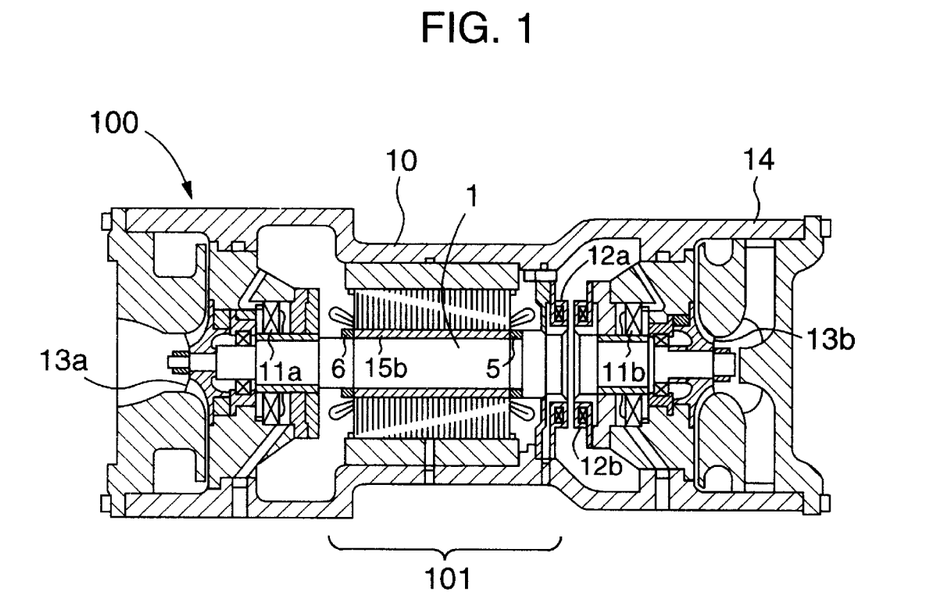
FIG. 1 is a cross-sectional view of a compressor as an electric rotary machine including a rotor according to the present invention.

Hereinafter, embodiments of the present invention will be described with reference to the attached drawings. FIG. 1 shows a vertical cross section of a two-stage air compressor 100 which is directly driven by an electric motor including a permanent magnet-excited rotor according to the present invention. In FIG. 1, the compressor 100 comprises a motor 101 in a middle portion thereof. The motor 101 includes a rotor 1 and a stator 10. The rotor 1 is supported by a pair of radial bearings 11a and 11b and a pair of thrust bearings 12a and 12b for rotation. Radial impellers 13a and 13b are attached to both shaft ends of the rotor 1.

Figure 2:
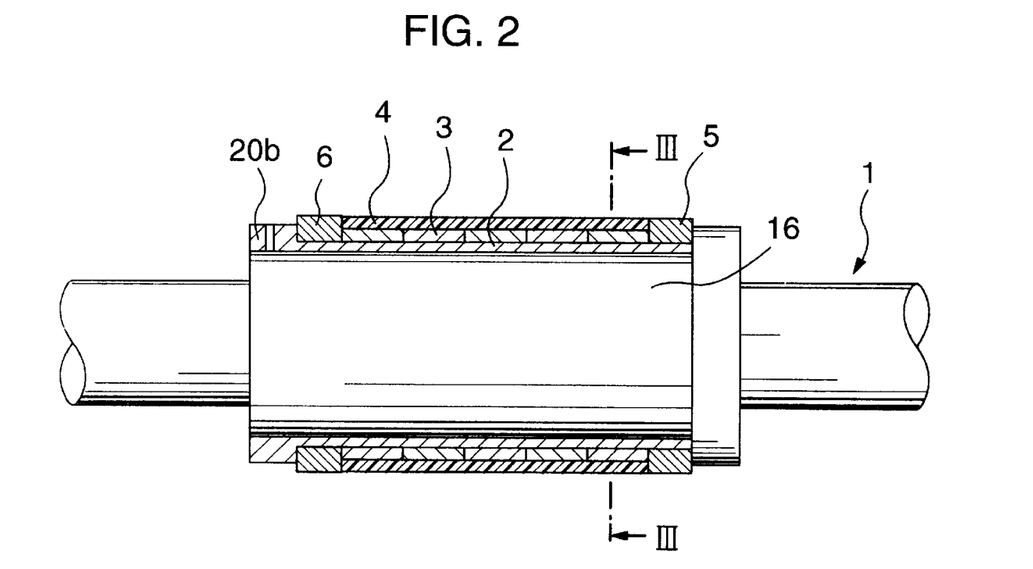
FIG. 2 is a side view of an embodiment of the rotor according to the present invention.
Figure 3:
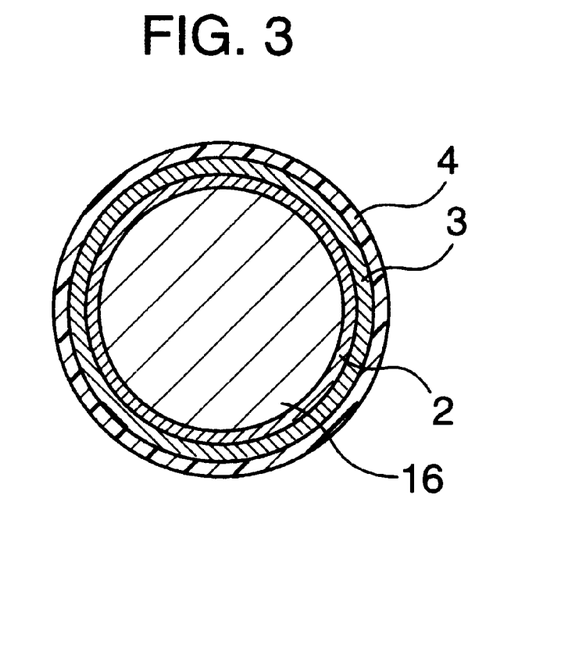
FIG. 3 is a cross-sectional view taken along line III—III in FIG. 2.

FIGS. 2 and 3 show the rotor 1 of the above centrifugal compressor 100.

The permanent magnet excited rotor 1 comprises a solid rotor shaft 16 made of steel which is a magnetic material, a steel sleeve 2 fitted on the rotor shaft 16, five cylindrical permanent magnets 3 disposed in series on an outer circumferential surface of the sleeve 2 in an axial direction of the rotor shaft 16, and a cylindrical protection cover 4 made of a carbon-fiber-reinforced plastic (CFRP) and disposed on an outer circumferential surfaces of the permanent magnets 3 so as to cover the permanent magnets 3.

The sleeve 2 is formed with an oil passage 20b for introducing hydraulic pressure to an inner circumferential surface of the sleeve 2. End rings 5 and 6 each made of a non-magnetic material are attached to both ends of the permanent magnets 3 and the CFRP protection cover 4 in the axial direction for preventing leakage of magnetic flux and protecting end surfaces of the permanent magnets. TAB6400 having a large specific strength is desirable for the material of the end rings 5 and 6.

Each of the permanent magnets 3 is a rare-earth magnet of neodymium-iron-boron which yields high flux density, and an anisotropic magnet in which an axis of easy magnetization is oriented in the radial direction. Each permanent magnet 3 is formed into a cylindrical shape by sintering and bipolarized in magnetism.

Next, a manufacturing method of the rotor constructed in the above manner will be described in detail with reference to FIGS. 4 to 8. First, assembling of the permanent magnets 3 and the protection cover 4 will be described. There are two methods. One is a method that a carbon fiber impregnated with a resin for adhesion is wound onto the outer circumferential surfaces of the permanent magnets 3a to 3e which are disposed in series, and then the resin is cured in a high-temperature furnace. The other is a method that the permanent magnets 3a to 3e are inserted in order into a CFRP protection cover 4 made in advance.

Figure 4:
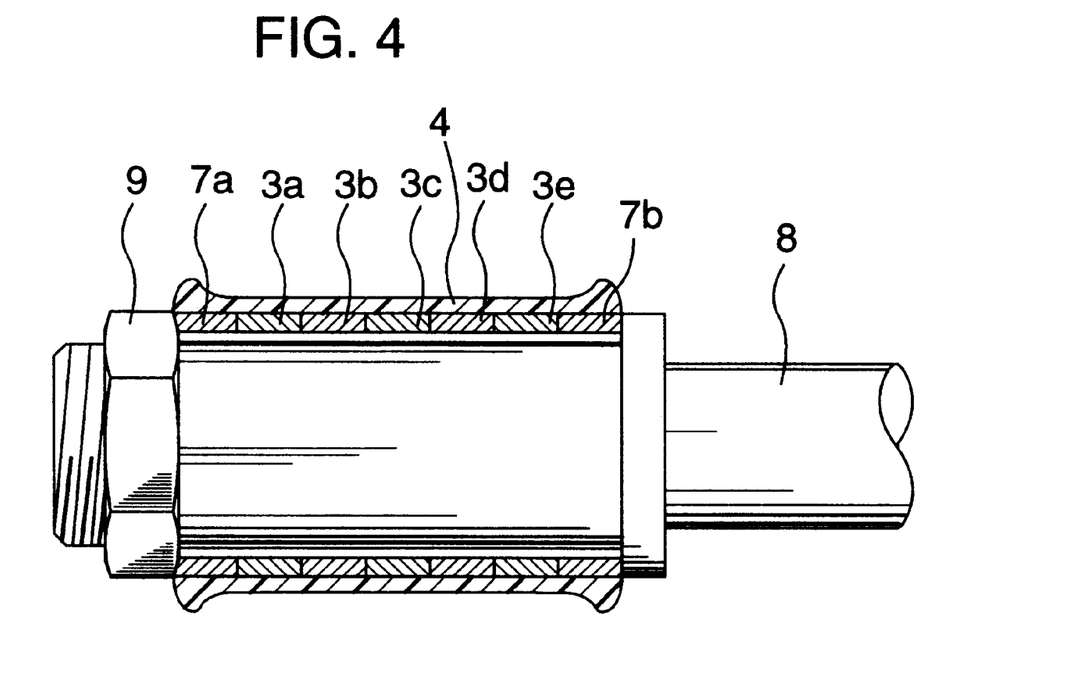
FIG. 4 is a view showing a manufacturing step of a protection cover of a fiber-reinforced plastic.

In the former method, the cylindrical permanent magnets 3a to 3e and a pair of dummy pieces 7a and 7b are fitted on a jig 8 and then fixed with a nut 9 as shown in FIG. 4. A CFRP is then wound on the outer circumferential surfaces of the magnets. The dummy pieces 7a and 7b are removed and lapel portions of both ends of the CFRP is away into a predetermined length.

In this method, the same material as the cylindrical permanent magnets 3a to 3e may be employed for the dummy pieces 7a and 7b. However, because the material for permanent magnet is expensive, a cheap material such as an aluminum alloy is preferable for the dummy pieces 7a and 7b. Besides, it is preferable to dispose a spring element such as a coned disc spring between the dummy piece 7a and the nut 9 though this feature is not illustrated in FIG. 4. If so, a displacement of the spring can absorb the difference in thermal expansion between the jig 8 and the permanent magnets 3a to 3e when they are heated to a high temperature for curing the CFRP. As a result, the fixture of the permanent magnet pieces is prevented from loosening in the heating step.

Figure 5:
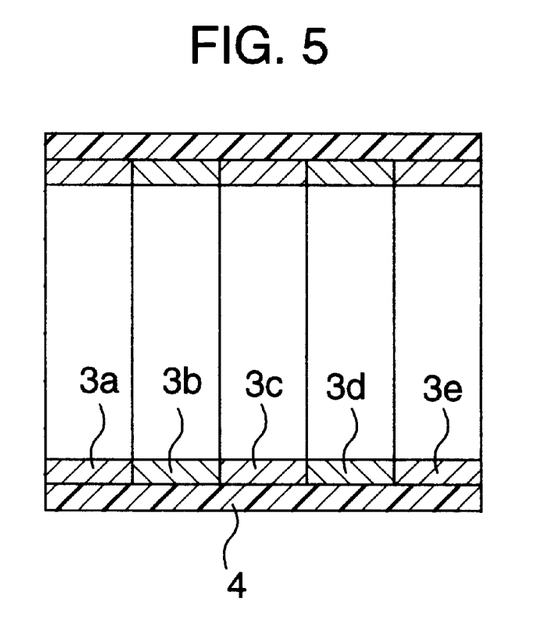
FIG. 5 is a cross-sectional view of a protection cover and permanent magnet assembly made through the manufacturing step shown in FIG. 4.

In the latter method, the cylindrical permanent magnets 3a to 3e are successively inserted in a predetermined order into a CFRP protection cover 4 which was made into a predetermined size in advance. In this case, each of the cylindrical permanent magnets 3a to 3e is formed so as to have an outside diameter slightly larger than an inside diameter of the CFRP protection cover 4 and the permanent magnets 3a to 3e are press fitted into the CFRP protection cover 4. In this manner, compression preloads act on the permanent magnets 3a to 3e. As a result, it is possible to reduce tensile loads acting on the permanent magnets when the permanent magnets are fitted onto the rotor shaft 16. Besides, it is also possible that the outer circumferential surface of the cylindrical magnets 3a to 3e and the inner circumferential surface of the CFRP protection cover 4 are tapered so that they are fitted to each other for fixture.

The CFRP has a very high strength in the direction along the fiber but only a strength corresponding to the resin strength in the direction normal to the fiber. That is, the tensile strength and the Young's modulus of the CFRP are in proportion to a cosine of an angle between the fiber direction and the load direction. Because the rotor of the present invention is used for a high-speed rotation, the inclination of 87° of the winding of the fiber to the axial direction of the rotor is employed in consideration of the fact that centrifugal forces act on the permanent magnets 3a to 3e upon the high-speed rotation. Because the fiber is wound almost perpendicularly to the axial direction of the rotor in this manner, the strength hardly deteriorates even near the ends of the CFRP protection cover 4 in the axial direction. The thickness of the CFRP protection cover 4 is given by the following equation (1) from the magnetic characteristics of the motor and the allowable centrifugal force of the permanent magnets 3a to 3e. For the matrix resin of the CFRP protection cover 4, a resin having a good thermal resistance is used because the temperature of the motor rises by heat generation. The inclination of the winding of the fiber to the axial direction of the rotor is desirably within the range from about 85° to about 90° from the viewpoint of strength.

$$t_c = (\sigma_m - \sigma_{am}) t_m / (\sigma_{ac} - \sigma_c) \quad (1)$$

where $\sigma_m$: centrifugal stress acting on permanent magnet,
$\sigma_{am}$: allowable tensile stress of permanent magnet,
$\sigma_{ac}$: allowable tensile stress of CFRP,
$\sigma_c$: centrifugal stress acting on CFRP,
$t_c$: thickness of CFRP protection cover, and
$t_m$: thickness of permanent magnet ring.

Figure 6:
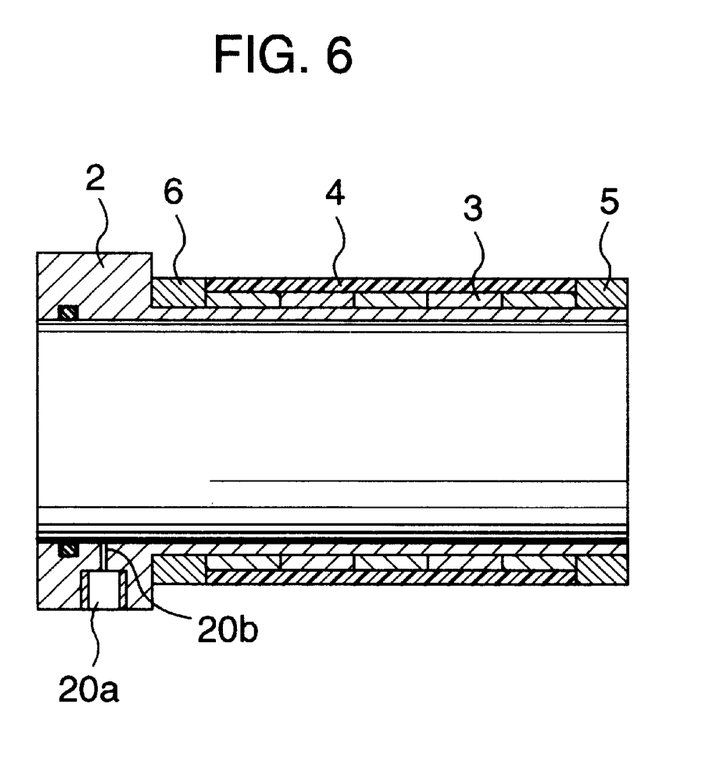
FIG. 6 is a cross-sectional view showing a condition that a steel sleeve is inserted into the protection cover and permanent magnet assembly.

Next, a steel sleeve 2 having almost the same outside diameter as the inside diameter of each permanent magnet 3 is prepared separately. The permanent magnets 3 and a pair of end rings 5 and 6 are then fitted onto the outer circumference of the steel sleeve 2 to form a permanent magnet assembly. The inside diameter of the steel sleeve 2 is smaller than the outside diameter of the rotor shaft 16 by a quantity corresponding to a necessary interference. The steel sleeve 2 is formed with hydraulic pressure injection port 20a and an oil passage 20b for hydraulic press fitting described later.

Figure 7:
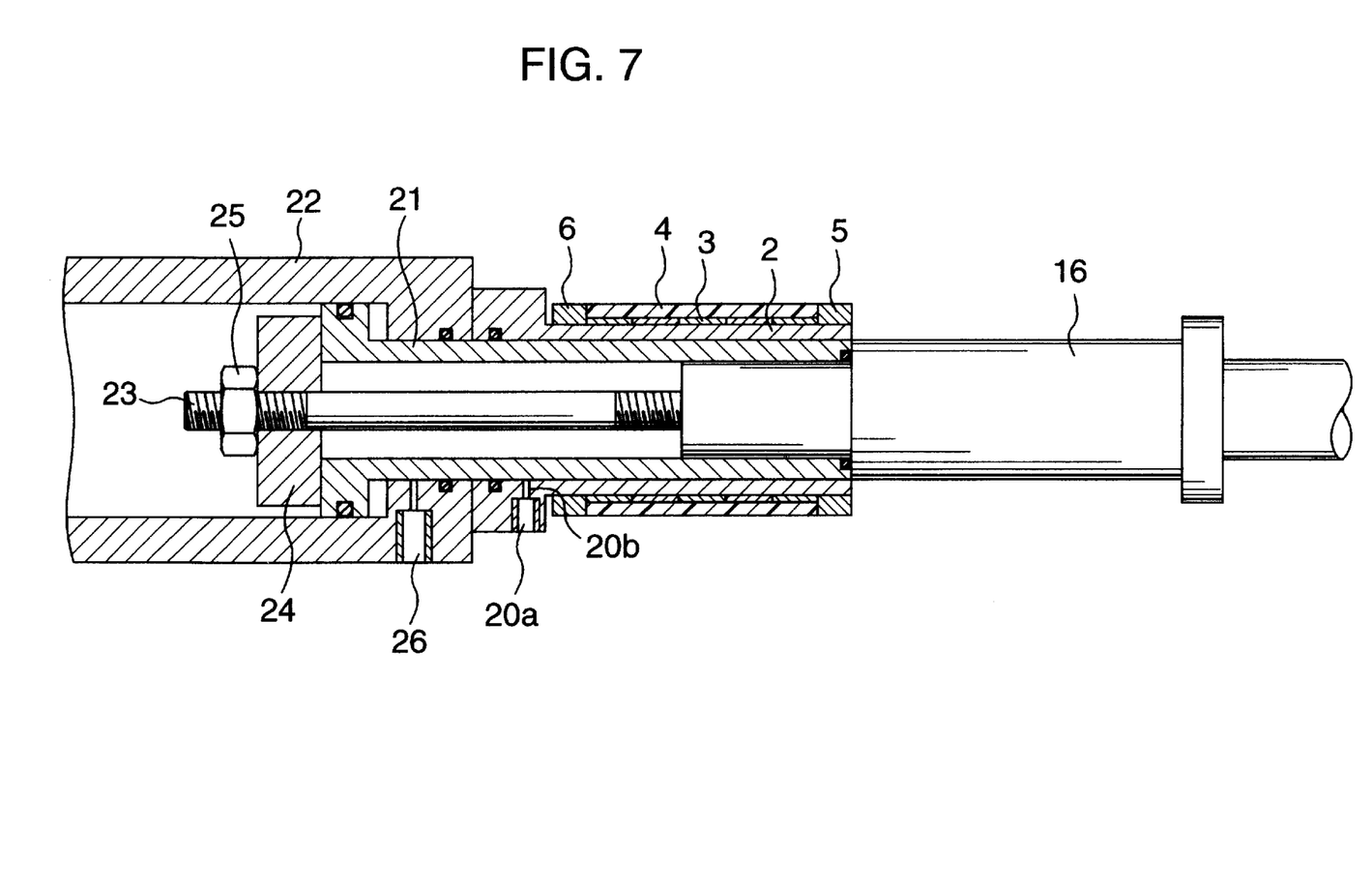
FIG. 7 is a cross-sectional view for illustrating a manufacturing method of the rotor according to the present invention in the state before applying hydraulic pressure.
Figure 8:
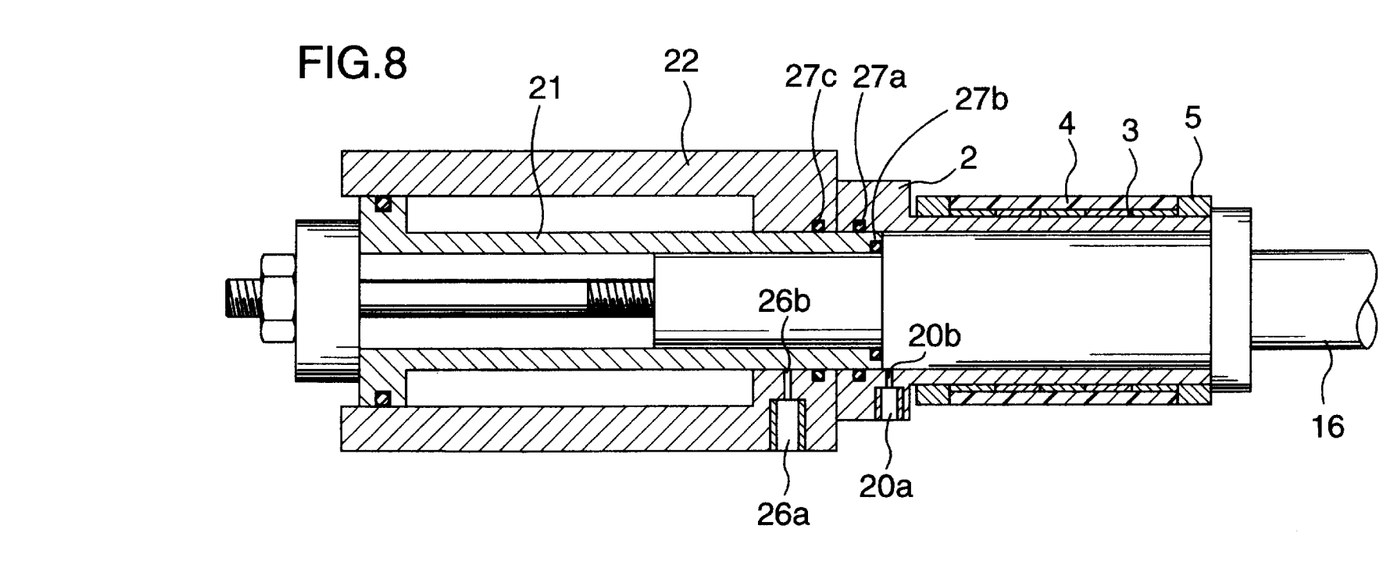
FIG. 8 is a cross-sectional view for illustrating the manufacturing method of the rotor according to the present invention in the state after applying hydraulic pressure.

Next, the manner that the permanent magnet assembly including the steel sleeve 2 is fitted onto the rotor shaft 16 will be described with reference to FIGS. 7 and 8. FIG. 7 shows the state immediately before the permanent magnet assembly is fitted onto the rotor shaft 16. FIG. 8 shows the state after the permanent magnet assembly is fitted onto the rotor shaft 16. As described above, the hydraulic pressure injection port 20a and the oil passage 20b are formed near an end of the steel sleeve 2 for introducing hydraulic pressure to the inner circumferential surface of the steel sleeve 2. The permanent magnet assembly is fitted onto an outer circumference of an inner tubular jig 21 onto which an outer tubular jig 22 is fitted in advance. A stud bolt 23 is screwed into an end portion of the rotor shaft 16 in advance. The inner tubular jig 21 is attached to an end portion of the rotor shaft 16 and fixed with clamp means 24 and 25. An injection hole 26 is formed in the outer tubular jig 22 for applying hydraulic pressure for forcible insertion of the rotor shaft.

Because the outside diameter of the rotor shaft 16 is larger than the outside diameter of the inner tubular jig 21 almost by the interference, a leading end of the rotor shaft 16 is desirably tapered so as to be easily inserted into the steel sleeve. In this state, while the steel sleeve 2 is being expanded by the hydraulic pressure applied through the injection port 20a, the rotor shaft 16 is forcibly inserted in the axial direction by the hydraulic pressure applied through the injection hole 26. After that, a disused portion of the injection port 20a of the steel sleeve 2 may be cut away.

The inside diameter of the steel sleeve 2 and the outside diameter of the rotor shaft 16 are so determined as to obtain an initial interference (initial compression force) corresponding to elongation of the permanent magnets due to centrifugal force. The interference is given by the following expressions.

$$\varepsilon \geq (3 - 2v) / \{8 E_{CFRP}(1 - v)\} \left\{ 2 r_3^2 + \frac{2 - 4v}{8(l - v)} r_2^2 \right\} \gamma_{CFRP} \omega^2 / g + \quad (2)$$

$$\frac{t_{mag}}{t_{CFRP}} \frac{l}{E_{CFRP}} \frac{(r_2 + r_1)^2}{4} \gamma_{max} \omega^2 / g$$

$$\Delta d = \varepsilon D \quad (3)$$

where $\varepsilon$: initial strain to be given to CFRP sleeve (initial strain to be given to steel sleeve), E: Young's modulus of CFRP sleeve,
v: Poisson's ratio of CFRP sleeve,
$r_3$: outside radius of CFRP sleeve,
$r_2$: inside radius of CFRP sleeve,
$r_1$: inside radius of magnet ring,
$\gamma_{CFRP}$: specific weight of CFRP sleeve,
$t_{CFRP}$: thickness of CFRP sleeve,
$t_{mag}$: thickness of magnet ring,
$\gamma_{mag}$: specific weight of magnet ring,
$\omega$: angular velocity of rotation of rotor,
D: inside diameter of CFRP sleeve, and
$\Delta d$: initial interference of CFRP sleeve (initial interference of steel sleeve).

The first term of the right side of the expression (2) corresponds to an interference through which the CFRP protection cover undertakes its own elongation due to centrifugal force, and the second term of the right side corresponds to an interference through which the CFRP protection cover undertakes the centrifugal force acting on the cylindrical permanent magnets. By giving an initial interference not less than the sum of both to the steel sleeve, a necessary clamping (compression) force can be given also to the CFRP protection cover. The magnets can thus be prevented from separating from the steel sleeve and so from the rotor shaft during rotation. In this embodiment, an interference ratio (ratio of the interference to the diameter of the rotor shaft) of not less than 3/1000, which can never be obtained by cooling fitting, was obtained. Besides, because the rotating members are restrained in the radial direction by the interference, the coaxiality of the rotating members is maintained. In this manner, the coaxiality of the magnets and CFRP protection cover can be maintained during operation and so a super high-speed rotor can be obtained. Furthermore, because the structure of the rotor can be axisymmetric according to this embodiment, the unbalance occurring in operation can be reduced and the torque can be surely generated. As a result, the reliability of the rotor is improved.

Figure 9:
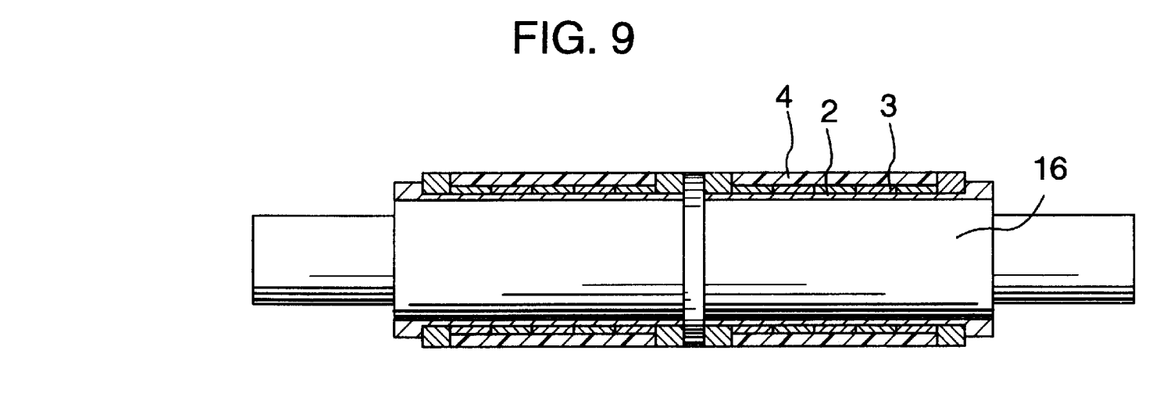
FIG. 9 is a partially cross-sectional view of another embodiment of a rotor according to the present invention.

In case of a high-power motor requiring long magnets, it is possible that two sets of permanent magnet assemblies are prepared and they are fitted onto a rotor shaft from both axial ends of it as shown in FIG. 9.

FIG. 1 shows a case of a two-stage air compressor equipped with an electric motor which includes the rotor manufactured in the above-described manner. A plurality of cylindrical permanent magnets are disposed in the direction along the axis of rotation to ensure the necessary length of magnet for high-power of the motor. In this manner, the output capacity of the compressor 100 is increased to the extent of about 100 kW. Besides, because the outer circumferential surfaces of the cylindrical permanent magnets are reinforced by the CFRP protection cover, the peripheral velocity of the permanent magnet portion not less than 250 m/s can be obtained. The present invention is effective in a rotor in which the peripheral velocity is not less than 240 m/s, and the effect is remarkable when the peripheral velocity is not less than 250 m/s.

What is claimed is:

1. A manufacturing method of a rotor for a permanent magnet-excited, high-speed electric rotary machine, comprising:

covering an outer circumferential surface of at least one permanent magnet by a protection cover with prestress compressing in radial direction;

inserting a steel sleeve into the at least one permanent magnet to form a permanent magnet assembly;

preparing at least one permanent magnet assembly;

inserting a rotor shaft into the steel sleeve while applying hydraulic pressure to an inner circumferential surface of the steel sleeve of the prepared at least one permanent magnet assembly to expand the steel sleeve; and removing the hydraulic pressure to tight fit the at least one permanent magnet assembly onto the rotor shaft.

2. The manufacturing method of a rotor according to claim 1, further comprising a step of cutting away a hydraulic pressure introducing passage of the steel sleeve for applying hydraulic pressure to an inner circumferential surface of the steel sleeve after removing hydraulic pressure.

3. The manufacturing method of a rotor according to claim 1, further comprising a step of disposing end rings on both ends of the at least one permanent magnet upon insertion of the steel sleeve.

4. The manufacturing method of a rotor according to claim 1, wherein said insertion of the rotor shaft is conducted by hydraulic pressure.

5. The manufacturing method of a rotor according to claim 1, wherein said step of covering the cylindrical permanent magnet with the protection cover includes fitting said at least one cylindrical permanent magnet into the protection cover which was made in advance.

6. The manufacturing method of a rotor according to claim 1, wherein said step of covering the cylindrical permanent magnet with the protection cover includes winding a fiber onto said at least one cylindrical permanent magnet at a predetermined tension while impregnating plastic resin.

7. A rotary electric machine including a rotor made by the manufacturing method of claim 1.

8. The manufacturing method of a rotor according to claim 1, wherein said protection cover is made of a carbon fiber-reinforced plastic disposed on the outer circumferential surface of the at least one permanent magnet.

9. The manufacturing method of a rotor according to claim 1, wherein said protection cover is disposed on the outer circumferential surface of the at least one permanent magnet by winding a carbon fiber impregnated with a resin for adhesion onto the outer circumferential surface of the at least one permanent magnet in an axial direction of the rotor shaft, and then curing said resin in a high-temperature furnace.

10. The manufacturing method of a rotor according to claim 1, wherein said protection cover includes fibers wound on the outer circumferential surface of the at least one permanent magnet with a predetermined tension while being impregnated by plastic resin.

11. An assembly process comprising:

forming a permanent magnet assembly comprising a cylindrical magnet, a cover disposed to contain an outer circumferential surface of said magnet, and a sleeve disposed to contain an inner circumferential surface of said magnet; and press-fitting a rotor shaft into the permanent magnet assembly by hydraulic pressure so as to expand an inner circumferential surface of the permanent magnet assembly to accommodate said rotor shaft.

12. The process according to claim 11, wherein said rotor shaft is hydraulically press fitted into said permanent magnet assembly with an interference ratio not less than 0.003.

13. The process according to claim 11, wherein said cover is made of a carbon fiber-reinforced plastic to cover the outer circumferential surface of said cylindrical magnet with a prestress compressing in radial direction.

14. The process according to claim 11, wherein said sleeve is provided with a passage for introducing hydraulic pressure to an inner circumferential surface thereof during said press-fitting of said rotor shaft.

15. The process according to claim 11, wherein said cover includes fibers wound on said cylindrical magnet with a predetermined tension while being impregnated by plastic resin.

16. The process according to claim 11, wherein said cover is disposed on the outer circumferential surface of the at least one permanent magnet by winding a carbon fiber impregnated with a resin for adhesion onto the outer circumferential surface of the permanent magnet in an axial direction of the rotor shaft, and then curing said resin in a high-temperature furnace.

17. An assembly process comprising:

forming a permanent magnet assembly comprised of a cylindrical magnet, a cover, and a sleeve; and inserting a rotor shaft into the permanent magnet assembly by hydraulic pressure so as to expand an inner circumferential surface of the permanent magnet assembly to accommodate said rotor shaft.

18. The process according to claim 17, wherein said rotor shaft is hydraulically press fitted into said permanent magnet assembly with an interference ratio not less than 0.003.

19. The process according to claim 17, wherein said cover is made of a carbon fiber-reinforced plastic to cover the outer circumferential surface of said cylindrical magnet with a prestress compressing in radial direction.

20. The process according to claim 17, wherein said sleeve is provided with a passage for introducing hydraulic pressure to an inner circumferential surface thereof during insertion of said rotor shaft.

21. The process according to claim 17, wherein said cover is disposed on the outer circumferential surface of the at least one permanent magnet by winding a carbon fiber impregnated with a resin for adhesion onto the outer circumferential surface of the permanent magnet in an axial direction of the rotor shaft, and then curing said resin in a high-temperature furnace.

* * * * *